(12) United States Patent
Tsuchiya (10) Patent No.: US 10,486,540 B2
(45) Date of Patent: Nov. 26, 2019

(54) ELECTRIC POWER CHARGING OF VEHICLE BASED ON CHARGING TIME SCHEDULE

(71) Applicant: Toyota Jidosha Kabushiki Kaisha, Toyota-shi, Aichi-ken (JP)

(72) Inventor: Yoshiyuki Tsuchiya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 92 days.

(21) Appl. No.: 15/856,894

(22) Filed: Dec. 28, 2017

(65) Prior Publication Data
US 2018/0194238 A1 Jul. 12, 2018

(30) Foreign Application Priority Data

Jan. 10, 2017 (JP) .................................. 2017-001624

(51) Int. Cl.
| | |
|---|---|
| *B60L 11/18* | (2006.01) |
| *B60L 58/12* | (2019.01) |
| *B60L 53/64* | (2019.01) |
| *H02J 11/00* | (2006.01) |
| *B60L 53/62* | (2019.01) |
| *B60L 53/60* | (2019.01) |
| *B60L 53/66* | (2019.01) |

(52) U.S. Cl.
CPC .............. *B60L 11/184* (2013.01); *B60L 53/64* (2019.02); *B60L 58/12* (2019.02); *B60L 53/60* (2019.02); *B60L 53/62* (2019.02); *B60L 53/66* (2019.02); *B60L 2260/58* (2013.01); *H02J 11/00* (2013.01)

(58) Field of Classification Search
CPC ......... B60L 11/184; B60L 53/64; B60L 58/12
USPC .................................................. 320/109, 155
See application file for complete search history.

(56) References Cited

U.S. PATENT DOCUMENTS

| | | | | | |
|---|---|---|---|---|---|
| 5,467,006 | A | * | 11/1995 | Sims ................... | B60H 1/00642 237/5 |
| 5,508,598 | A | * | 4/1996 | Al-Abassy ............ | H02J 7/0086 320/129 |
| 5,650,710 | A | * | 7/1997 | Hotta ..................... | B60L 3/0046 320/128 |
| 6,208,116 | B1 | * | 3/2001 | Fischedick ............ | H02J 7/0006 320/125 |
| 6,937,162 | B2 | * | 8/2005 | Tokitsu ................. | G07B 15/063 340/425.5 |

(Continued)

FOREIGN PATENT DOCUMENTS

JP 2014107934 A 6/2014

*Primary Examiner* — Robert Grant
*Assistant Examiner* — John T Trischler
(74) *Attorney, Agent, or Firm* — Dinsmore & Shohl LLP (57) ABSTRACT

An electronic control unit is configured to start external charging in accordance with a time schedule. The electronic control unit is configured to acquire information about electric power rates of electric power supplied from the power source outside the vehicle in each specified time slot. The electronic control unit is configured to determine the time schedule so as to execute the external charging continuously from a start to an end of the external charging without stopping the external charging and execute the external charging at the time when the electric power cost in a case where the external charging is continuously executed is the lowest.

6 Claims, 6 Drawing Sheets

(56) References Cited

U.S. PATENT DOCUMENTS

| | | | | |
|---|---|---|---|---|
| 7,657,374 | B2* | 2/2010 | Kamiya | B60R 21/0134 340/436 |
| 7,679,336 | B2* | 3/2010 | Gale | B60L 53/14 320/155 |
| 7,719,232 | B2* | 5/2010 | Kelty | B60L 3/0092 320/132 |
| 7,747,739 | B2* | 6/2010 | Bridges | B60L 3/12 709/224 |
| 7,782,021 | B2* | 8/2010 | Kelty | B60L 3/0092 320/155 |
| 7,786,704 | B2* | 8/2010 | Kelty | B60L 3/0092 320/155 |
| 8,204,638 | B2* | 6/2012 | Tani | B60K 6/48 701/22 |
| 8,359,132 | B2* | 1/2013 | Laberteaux | G06Q 50/06 701/22 |
| 8,476,865 | B2* | 7/2013 | Iwanaga | B60K 6/445 320/104 |
| 8,664,915 | B2* | 3/2014 | Sutardja | B60L 58/12 320/109 |
| 8,669,739 | B2* | 3/2014 | Ohtomo | H02J 7/0031 320/109 |
| 8,688,305 | B2* | 4/2014 | Choi | G06Q 50/30 701/22 |
| 8,706,914 | B2* | 4/2014 | Duchesneau | G06F 9/5072 709/203 |
| 8,706,915 | B2* | 4/2014 | Duchesneau | G06F 9/5072 709/203 |
| 8,716,978 | B2* | 5/2014 | Kim | B60L 58/13 320/109 |
| 8,751,088 | B2* | 6/2014 | Choi | G06Q 50/30 701/22 |
| 8,810,192 | B2* | 8/2014 | Bridges | G06Q 50/06 320/107 |
| 8,825,247 | B2* | 9/2014 | Kim | H02J 7/0004 701/22 |
| 8,854,013 | B2* | 10/2014 | Gao | G06F 1/26 320/155 |
| 8,872,379 | B2* | 10/2014 | Ruiz | G06Q 50/06 307/66 |
| 8,896,266 | B2* | 11/2014 | Ohtomo | B60L 3/0069 320/109 |
| 8,898,278 | B2* | 11/2014 | Bridges | B60L 53/57 709/224 |
| 8,918,376 | B2* | 12/2014 | Ambrosio | B60L 11/1824 707/694 |
| 8,935,023 | B2* | 1/2015 | Hirota | B60L 11/1851 701/22 |
| 9,024,571 | B2* | 5/2015 | Uyeki | B60L 53/68 320/101 |
| 9,123,035 | B2* | 9/2015 | Penilla | G06Q 20/18 |
| 9,129,272 | B2* | 9/2015 | Penilla | G06Q 20/18 |
| 9,143,392 | B2* | 9/2015 | Duchesneau | G06F 9/5072 |
| 9,156,366 | B2* | 10/2015 | Kim | B60L 11/1844 |
| 9,177,305 | B2* | 11/2015 | Penilla | G06Q 20/18 |
| 9,177,306 | B2* | 11/2015 | Penilla | G06Q 20/18 |
| 9,187,005 | B2* | 11/2015 | Sutardja | B60L 53/64 |
| 9,193,277 | B1* | 11/2015 | Penilla | G06Q 20/18 |
| 9,274,540 | B2* | 3/2016 | Anglin | G05F 5/00 |
| 9,335,179 | B2* | 5/2016 | Penilla | G06Q 20/18 |
| 9,346,365 | B1* | 5/2016 | Penilla | G06Q 30/0265 |
| 9,429,436 | B2* | 8/2016 | Wippler, III | G01C 21/26 |
| 9,434,270 | B1* | 9/2016 | Penilla | G06Q 30/0265 |
| 9,436,948 | B2* | 9/2016 | Bridges | G06Q 50/06 |
| 9,448,078 | B2* | 9/2016 | Nishida | G01C 21/3453 |
| 9,581,997 | B1* | 2/2017 | Penilla | G05D 1/0011 |
| 9,597,973 | B2* | 3/2017 | Penilla | G06Q 20/18 |
| 9,597,975 | B2* | 3/2017 | Ito | B60L 53/51 |
| 9,604,533 | B2* | 3/2017 | Itoh | B60K 11/085 |
| 9,630,518 | B2* | 4/2017 | Gibeau | B60L 58/13 |
| 9,639,904 | B2* | 5/2017 | Idrees | H02J 3/32 |
| 9,674,771 | B2* | 6/2017 | Bridges | B60L 53/57 |
| 9,697,733 | B1* | 7/2017 | Penilla | G05D 1/0011 |
| 9,718,370 | B2* | 8/2017 | Penilla | G06Q 30/0265 |
| 9,738,168 | B2* | 8/2017 | Penilla | G06Q 20/18 |
| 9,744,873 | B2* | 8/2017 | Riley | B60L 3/12 |
| 9,802,500 | B1* | 10/2017 | Penilla | G06Q 30/0265 |
| 9,834,109 | B2* | 12/2017 | Kosetsu | B60L 58/12 |
| 9,853,488 | B2* | 12/2017 | Fincham | B60L 3/12 |
| 9,925,882 | B2* | 3/2018 | Penilla | G06Q 20/18 |
| 9,995,591 | B2* | 6/2018 | Shimizu | G01C 21/3469 |
| 10,011,183 | B2* | 7/2018 | Shimizu | B60L 11/1844 |
| 10,065,520 | B2* | 9/2018 | Zhang | B60L 11/1848 |
| 10,071,643 | B2* | 9/2018 | Penilla | G06Q 30/0265 |
| 10,086,714 | B2* | 10/2018 | Penilla | G06Q 20/18 |
| 10,217,160 | B2* | 2/2019 | Penilla | B60S 5/06 |
| 10,220,718 | B2* | 3/2019 | Malik | B60L 58/12 |
| 10,245,964 | B2* | 4/2019 | Penilla | B60L 11/1822 |
| 10,274,948 | B2* | 4/2019 | Penilla | G05D 1/0011 |
| 10,279,698 | B2* | 5/2019 | Bridges | G06Q 50/06 |
| 10,286,801 | B2* | 5/2019 | Shimizu | H02J 3/00 |
| 2003/0023540 | A2* | 1/2003 | Johnson | G06Q 10/04 705/37 |
| 2008/0136371 | A1* | 6/2008 | Sutardja | B60L 58/12 320/109 |
| 2008/0203814 | A1* | 8/2008 | Kamiya | B60R 21/0134 307/10.1 |
| 2008/0203973 | A1* | 8/2008 | Gale | B60L 53/14 320/157 |
| 2008/0215199 | A1* | 9/2008 | Aoyama | H02J 7/1423 701/22 |
| 2009/0021218 | A1* | 1/2009 | Kelty | B60L 3/0092 320/137 |
| 2009/0063680 | A1* | 3/2009 | Bridges | B60L 53/57 709/224 |
| 2009/0200988 | A1* | 8/2009 | Bridges | G06Q 50/06 320/137 |
| 2009/0212745 | A1* | 8/2009 | Kelty | B60L 3/0092 320/162 |
| 2009/0216688 | A1* | 8/2009 | Kelty | B60L 3/0092 705/418 |
| 2009/0216910 | A1* | 8/2009 | Duchesneau | G06F 9/5072 709/250 |
| 2009/0319110 | A1* | 12/2009 | Tani | B60K 6/48 701/22 |
| 2010/0017249 | A1* | 1/2010 | Fincham | B60L 3/12 705/412 |
| 2010/0049737 | A1* | 2/2010 | Ambrosio | B60L 11/1824 705/412 |
| 2010/0191398 | A1* | 7/2010 | Hirota | B60L 11/1851 701/22 |
| 2010/0292855 | A1* | 11/2010 | Kintner-Meyer | B60L 1/08 700/291 |
| 2011/0031047 | A1* | 2/2011 | Tarr | B60L 5/005 180/65.1 |
| 2011/0047102 | A1* | 2/2011 | Grider | B60L 8/003 705/412 |
| 2011/0078092 | A1* | 3/2011 | Kim | B60L 50/66 705/412 |
| 2011/0193532 | A1* | 8/2011 | Iwanaga | H02J 7/02 320/163 |
| 2011/0204720 | A1* | 8/2011 | Ruiz | G06Q 50/06 307/66 |
| 2011/0224852 | A1* | 9/2011 | Profitt-Brown | B60L 53/64 701/22 |
| 2011/0270476 | A1* | 11/2011 | Doppler | B60L 15/2045 701/22 |
| 2011/0313603 | A1* | 12/2011 | Laberteaux | G06Q 50/06 701/22 |
| 2012/0161702 | A1* | 6/2012 | Kim | B60L 58/13 320/109 |
| 2012/0197693 | A1* | 8/2012 | Karner | G06Q 20/102 705/14.1 |
| 2012/0239594 | A1* | 9/2012 | Boot | B60L 53/305 705/412 |
| 2012/0249065 | A1* | 10/2012 | Bissonette | H02J 3/381 320/109 |
| 2012/0319648 | A1* | 12/2012 | Ohtomo | B60L 3/0069 320/109 |

(56) References Cited

U.S. PATENT DOCUMENTS

| | | | |
|---|---|---|---|
| 2013/0006461 A1* | 1/2013 | Kim | H02J 7/0004 701/22 |
| 2013/0009598 A1* | 1/2013 | Ohtomo | H02J 7/0031 320/109 |
| 2013/0024035 A1* | 1/2013 | Ito | B60L 53/51 700/291 |
| 2013/0093393 A1* | 4/2013 | Shimotani | B60L 3/12 320/109 |
| 2013/0096751 A1* | 4/2013 | Riley | B60L 3/12 701/22 |
| 2013/0124320 A1* | 5/2013 | Karner | G06Q 20/102 705/14.54 |
| 2013/0127417 A1* | 5/2013 | Karner | G06Q 20/102 320/109 |
| 2013/0151293 A1* | 6/2013 | Karner | G06Q 20/102 705/5 |
| 2013/0169233 A1* | 7/2013 | Tonegawa | B60L 3/0046 320/134 |
| 2013/0234651 A1* | 9/2013 | Buford | B60L 53/68 320/107 |
| 2013/0253746 A1* | 9/2013 | Choi | G06Q 50/30 701/22 |
| 2013/0306276 A1* | 11/2013 | Duchesneau | G06F 9/5072 165/104.21 |
| 2013/0311404 A1* | 11/2013 | Choi | G06Q 50/30 705/412 |
| 2014/0006137 A1* | 1/2014 | Melen | G06Q 10/1093 705/14.35 |
| 2014/0091747 A1* | 4/2014 | Uyeki | B60L 53/68 320/101 |
| 2014/0125279 A1* | 5/2014 | Juhasz | B60L 53/305 320/109 |
| 2014/0163756 A1* | 6/2014 | Idrees | H02J 3/32 700/291 |
| 2014/0184156 A1* | 7/2014 | Sutardja | B60L 11/1824 320/109 |
| 2014/0184170 A1* | 7/2014 | Jeong | B60L 11/1844 320/137 |
| 2014/0203077 A1* | 7/2014 | Gadh | H02J 7/00 235/382 |
| 2014/0203775 A1* | 7/2014 | Kim | B60L 11/1844 320/109 |
| 2014/0317315 A1* | 10/2014 | Duchesneau | G06F 9/5072 709/250 |
| 2015/0077056 A1* | 3/2015 | Bridges | G06Q 50/06 320/109 |
| 2015/0208331 A1* | 7/2015 | Bridges | H04W 48/16 455/434 |
| 2015/0226564 A1* | 8/2015 | Nishida | G01C 21/3453 701/526 |
| 2015/0283912 A1* | 10/2015 | Shimizu | B60L 11/1862 320/157 |
| 2015/0298569 A1 | 10/2015 | Kosetsu | |
| 2015/0367723 A1* | 12/2015 | Itoh | B60K 11/085 701/22 |
| 2016/0009192 A1* | 1/2016 | Zhang | B60L 11/1848 320/109 |
| 2016/0047862 A1* | 2/2016 | Shimizu | H02J 3/00 702/63 |
| 2016/0075248 A1* | 3/2016 | Jeong | B60L 11/1844 320/162 |
| 2016/0202069 A1* | 7/2016 | Wippler, III | G01C 21/26 701/400 |
| 2016/0248631 A1* | 8/2016 | Duchesneau | G06F 9/5072 |
| 2016/0264008 A1* | 9/2016 | Kintner-Meyer | B60L 1/08 |
| 2016/0347195 A1* | 12/2016 | Bridges | G06Q 50/06 |
| 2016/0362013 A1* | 12/2016 | Gibeau | B60L 1/003 |
| 2016/0375780 A1* | 12/2016 | Penilla | G06Q 30/0265 320/109 |
| 2017/0120761 A1* | 5/2017 | Kapadia | B60L 11/184 |
| 2017/0120906 A1* | 5/2017 | Penilla | G05D 1/0011 |
| 2017/0169712 A1* | 6/2017 | Penilla | G05D 1/0011 |
| 2017/0176195 A1* | 6/2017 | Rajagopalan | G01C 21/3415 |
| 2017/0259683 A1* | 9/2017 | Shimizu | B60L 11/1844 |
| 2017/0261331 A1* | 9/2017 | Shimizu | G01C 21/3469 |
| 2017/0320398 A1* | 11/2017 | Penilla | G06Q 30/0265 |
| 2018/0012497 A1* | 1/2018 | Penilla | G05D 1/0011 |
| 2018/0022228 A1* | 1/2018 | Mazaira | B60L 11/1851 320/109 |
| 2018/0037125 A1* | 2/2018 | Penilla | G06Q 30/0265 |
| 2018/0098271 A1* | 4/2018 | Bridges | B60L 53/57 |
| 2018/0122245 A1* | 5/2018 | Penilla | G05D 1/0011 |
| 2018/0131221 A1* | 5/2018 | Ambroziak | B60L 3/12 |
| 2018/0290553 A1* | 10/2018 | Malik | B60L 58/12 |
| 2018/0312072 A1* | 11/2018 | Yang | B60L 53/62 |

* cited by examiner

ELECTRIC POWER CHARGING OF VEHICLE BASED ON CHARGING TIME SCHEDULE

CROSS-REFERENCE TO RELATED APPLICATIONS

This application claims priority to Japanese Patent Application No. 2017-001624 filed on Jan. 10, 2017, incorporated herein by reference in its entirety.

BACKGROUND

1. Technical Field

The present disclosure relates to a charge controller and a charge control method for controlling execution of external charging to charge an electric storage device mounted on a vehicle with a power source outside the vehicle. The present disclosure relates more specifically to a technique of timer charging that executes external charging in accordance with a time schedule.

2. Description of Related Art

Japanese Patent Application Publication No. 2014-107934 discloses a vehicle capable of executing external charging in a timer charging mode. According to the disclosure of JP 2014-107934 A, it is desirable to minimize the number of times of temporary stop of the external charging from a viewpoint of preventing deterioration of a relay that operates at the time of temporary stop and at the time of restart of the external charging (see paragraph 0006 of JP 2014-107934 A). It is also disclosed in JP 2014-107934 A that a time slot (priority time slot) for preferentially performing external charging may be set to the time slot offering low electric power rates based on the electric power rates at the time of external charging and that a plurality of priority time slots may be set in that case (see paragraph 0040 of JP 2014-107934 A).

SUMMARY

When the time slot (priority time slot) for preferentially performing external charging is set to the time slot offering low electric power rates on the basis of the electric power rates at the time of external charging, the time slot for performing external charging may be divided and set to a plurality of time slots, depending on the setting of the electric power rates. As a consequence, the number of times of operating devices (for example, a charging relay provided in a charge path) which operate at the time of execution and stop of the external charging increases, so that the durability of the components of the devices decreases.

Accordingly, it is an object of the present disclosure to pursue inexpensive external charging, while suppressing increase in the number of times of operation of a device that operates with execution and stop of the external charging in a charge controller and a charge control method that control execution of the external charging.

A first aspect of the present disclosure relates to a charge controller that controls execution of external charging to charge an electric storage device mounted on a vehicle with a power source outside the vehicle. The charge controller includes an electronic control unit. The electronic control unit is configured to start the external charging in accordance with a time schedule. The electronic control unit is configured to acquire information about electric power rates of electric power supplied from the power source in each specified time slot. The electronic control unit is configured to determine the time schedule so as to execute the external charging continuously from a start to an end of the external charging without stopping the external charging and execute the external charging at a time when an electric power cost in a case where the external charging is continuously executed is the lowest.

A second aspect of the present disclosure relates to a charge control method for controlling execution of external charging to charge an electric storage device mounted on a vehicle with a power source outside the vehicle. The charge control method includes acquiring information about electric power rates of electric power supplied from the power source in each specified time slot, determining a time schedule of the external charging so as to execute the external charging continuously from a start to an end of the external charging without stopping the external charging and execute the external charging at a time when an electric power cost in a case where the external charging is continuously executed it the lowest, and starting the external charging in accordance with the time schedule.

According to the foregoing aspects, the external charging is executed continuously from the start to the end of the external charging without stopping the external charging. Accordingly, increase in the number of times of operation of a device (such as a relay provided in a charge path) that operates with execution and stop of the external charging is suppressed. Since the time schedule is determined so as to execute the external charging at the time when an electric power cost in a case where the external charging is continuously executed is the lowest, electric power costs can be reduced. Accordingly, the charge controller and the charge control method make it possible to pursue inexpensive external charging, while suppressing increase in the number of times of operation of the device that operates with execution and stop of the external charging.

The electronic control unit may be configured to, even when a request time schedule set in accordance with a request from a user includes a stop of the external charging during a period from the start to the end of the external charging, continuously executes the external charging and execute the external charging at a time when the electric power cost in the case where the external charging is continuously executed is the lowest.

According to the aspect, inexpensive external charging can be pursued, while a priority is placed on the user request, and the increase in the number of times of operation of the device can be suppressed.

A device that operates with execution and stop of the external charging may be provided in a charge path extending from the power source to the electric storage device. The device may include a relay. The electronic control unit may be configured to execute processing of determining the time schedule when a total number of times of operation of the relay exceeds a threshold.

According to the aspect, the increase in the total number of times of operation of the relay is suppressed only when the total number of times of operation of the relay exceeds a threshold. When the total number of times of operation of the relay is equal to or below the threshold, the time of executing the external charging can be divided and assigned to a plurality of time slots that offer relatively low electric power rates so as to pursue the most inexpensive external charging without taking into consideration the number of times of operation of the relay.

The electronic control unit may be configured to notify the user of a change of the time schedule from the request time schedule to the time schedule which is determined by the electronic control unit.

According to the aspect, the user can recognize that the time schedule is changed in order to suppress the increase in the total number of times of operation of the relay.

According to the present disclosure, it is possible to pursue inexpensive external charging, while suppressing increase in the number of times of operation of a device that operates with execution and stop of the external charging in a charge controller and a charge control method that control execution of the external charging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, embodiments of the present disclosure will be described in detail with reference to the drawings. Note that identical or like component members are designated by identical reference numerals to omit the description thereof.

Figure 1:
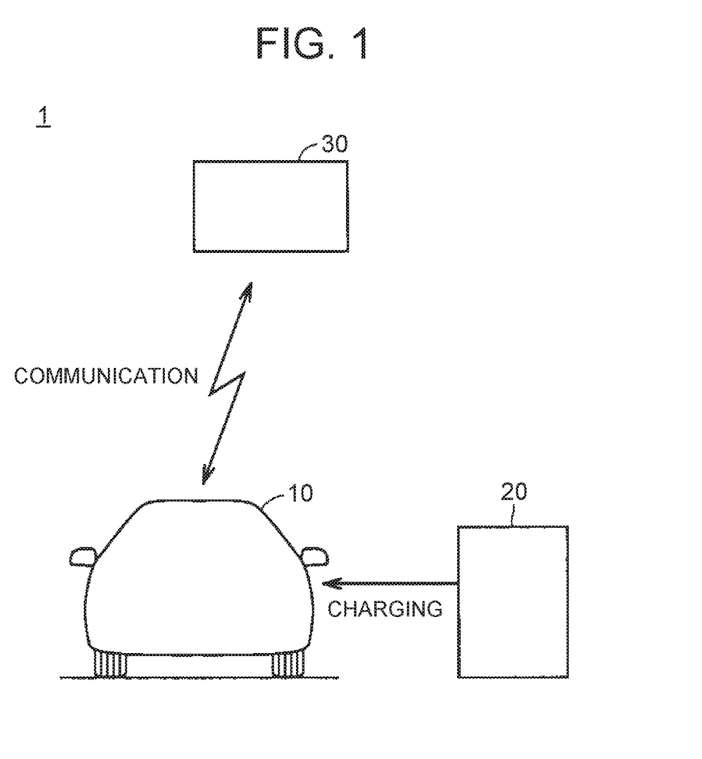
FIG. 1 illustrates a vehicle charging system to which a charge controller according to an embodiment of the present disclosure is applied.

FIG. 1 illustrates a vehicle charging system to which a charge controller according to an embodiment of the present disclosure is applied. With reference to FIG. 1, a vehicle charging system 1 includes a vehicle 10, a power supply facility 20, and a data center 30.

The vehicle 10 is configured such that an on-vehicle electric storage device (not illustrated) is chargeable upon reception of electric power from the power supply facility 20 outside the vehicle. That is, the vehicle 10 is configured to be able to execute external charging. In one example, the vehicle 10 receives electric power from the power supply facility 20 when an inlet of the vehicle 10 is connected to a charging connector provided at a top end of a charging cable extending from the power supply facility 20. The vehicle 10 may incorporate a receiving coil to receive electric power, the receiving coil being configured to receive electric power in a non-contact fashion from a power transmitting coil that supplies alternate current electric power from the power supply facility 20 through a magnetic field. For example, the vehicle 10 is an electric motor vehicle, such as a hybrid vehicle or an electric vehicle, which can travel by using the electric power stored in the electric storage device.

The vehicle 10 is configured to be able to execute timer charging that starts external charging in accordance with a time schedule. For example, in the embodiment, the user sets an expected time of departure of the vehicle 10. In accordance with the expected time of departure, the time schedule for timer charging is determined in consideration of factors such as an electric power rate during external charging, and the time taken for the external charging. In accordance with the time schedule, the vehicle 10 executes charging of the electric storage device with the power supply facility 20. A method for determining the time schedule will be described later in detail.

The vehicle 10 is configured to be able to communicate with the data center 30 through communication means which is not illustrated. In preparation of the time schedule for timer charging, the vehicle 10 acquires information about the electric power rates of electric power supplied from the power supply facility 20 in each specified time slot. The information is acquired from the data center 30 through the communication means.

The power supply facility 20 is a power source that supplies the electric power used to charge the electric storage device mounted on the vehicle 10 to the vehicle 10. In the embodiment, although the power supply facility 20 is provided in a parking area of a residence of the user, the power supply facility 20 may be provided in a parking facility other than the parking facility of the residence. The power supply facility 20 supplies charging electric power to the vehicle 10 in accordance with an electric power supply request from the vehicle 10.

The data center 30 is configured to be able to communicate with the vehicle 10 through the communication means which is not illustrated. For example, the data center 30 is a server managed by an electric power company. The data center 30 manages electric power rate plans (electric power rate unit prices in each time slot), and transmits the electric power rate information including the electric power rate plan applied at the time of the external charging of the vehicle 10 to the vehicle 10. The vehicle 10 can prepare the time schedule for timer charging to reflect the electric power rate plan acquired from the data center 30.

In the embodiment, the electric power rate plan applied at the time of the external charging of the vehicle 10 is transmitted from the data center 30 to the vehicle 10. However, the user may set the electric power rate plan by inputting an electric power rate unit price for each time slot in the vehicle 10 or in a device such as a mobile terminal that can communicate with the vehicle 10.

Figure 2:
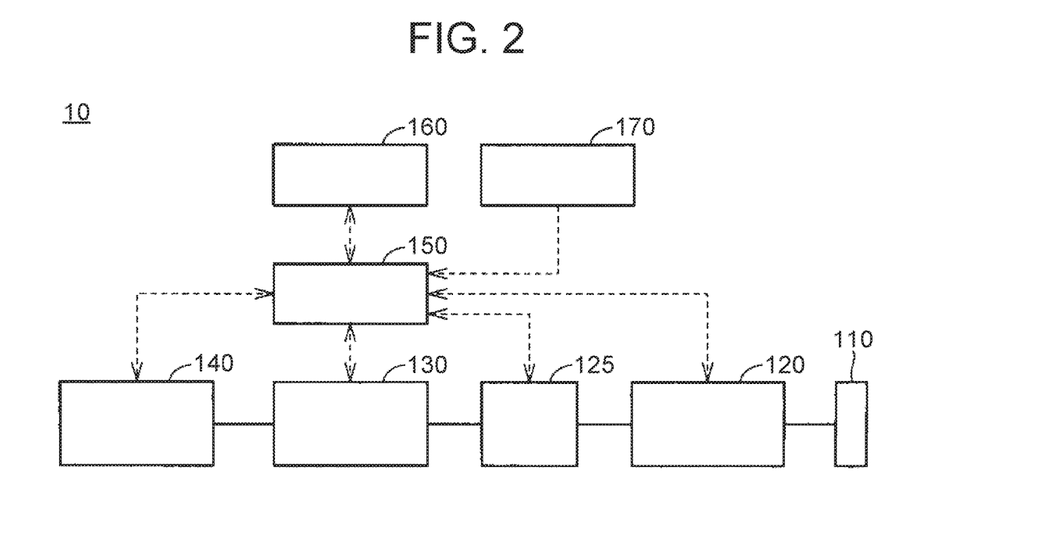
FIG. 2 is a block diagram schematically illustrating the configuration of a vehicle illustrated in FIG. 1.

FIG. 2 is a block diagram schematically illustrating the configuration of the vehicle 10 illustrated in FIG. 1. With reference to FIG. 2, the vehicle 10 includes a power reception unit 110, a charger 120, a charging relay 125, an electric storage device 130, a driving unit 140, an electric control unit (ECU) 150, a multi-information display (MID) 160, and a data communication module (DCM) 170.

The power reception unit 110 is an electric power interface that receives electric power supplied from the power supply facility 20 (FIG. 1). For example, the power reception unit 110 is formed from an inlet connectable to a connector of the charging cable extending from the power supply facility 20. In a case of adopting a non-contact power transmission scheme using transmitting and receiving coils, the power reception unit 110 is formed from a power receiving coil that receives electric power in the non-contact manner through the magnetic field from a power transmitting coil that is electrically connected to the power supply facility 20.

The charger 120 is controlled by the ECU 150. The charger 120 converts the voltage of the electric power received by the power reception unit 110 into a voltage level of the electric storage device 130, and outputs the converted voltage to the electric storage device 130. The charger 120 is configured to include a rectifier and an inverter, for example.

The charging relay 125 is provided in an electric line between the charger 120 and the electric storage device 130. The charging relay 125 is controlled by the ECU 150. The charging relay 125 is controlled to be in a conductive state (ON) at the start of external charging, and is controlled to be in an electric power cutoff state (OFF) at the moment when the external charging is stopped.

When the time of the external charging is divided into a plurality of charging sections, the external charging is temporarily stopped. During the stop of the external charging, the charging relay 125 is controlled to be in the electric power cutoff state from viewpoints of ensuring safety, protecting component members, and the like. When the external charging is restarted, the charging relay 125 is again controlled to be in the conductive state.

The electric storage device 130 can store the electric power output from the charger 120, and supply the stored electric power to the driving unit 140. The electric storage device 130 is configured to include a secondary battery, such as a nickel-hydrogen battery, a lithium ion battery, or an electrical double layer capacitor, for example. The electric storage device 130 can also store the electric power generated in the driving unit 140.

The driving unit 140 generates driving force used to drive driving wheels (not illustrated) for travel of the vehicle 10. Although not illustrated in particular, the driving unit 140 includes a converter and an inverter that receive supply of electric power from the electric storage device 130. The driving unit 140 also includes a motor that is driven by the inverter to drive the driving wheels and to perform regenerative power generation at the time of braking of the vehicle 10. The driving unit 140 may include a generator that generates electric power for charging the electric storage device 130, and an engine that can drive the generator.

The MID 160 is a display device that displays various information of the vehicle 10 and enables the user to perform operational input. For example, the MID 160 is configured to include a display, such as a liquid crystal display and an organic electro-luminescence (EL) display that allow touch input. The vehicle 10 can execute timer charging that starts external charging in accordance with a time schedule. The user can request the timer charging by operating the MID 160. In the embodiment, the MID 160 is configured to enable the user to input an expected time of departure of the vehicle 10 after the external charging is executed. The ECU 150 executes the timer charging in accordance with the time schedule determined based on the input expected time of departure.

The DCM 170 is a communication device that performs wireless communication with facilities outside the vehicle, the facilities being capable of performing wireless communication. In the embodiment, the DCM 170 can wirelessly communicate with a communication device of the data center 30 (FIG. 1). The DCM 170 receives the electric power rate information including the electric power rate plan applied at the time of the external charging of the vehicle 10 from the data center 30, and transmits the information to the ECU 150.

The ECU 150 includes a central processing unit (CPU), a memory, an input buffer and an output buffer (which are not illustrated) to execute various control in the vehicle 10. Typically, the ECU 150 controls the driving unit 140 to execute traveling control of the vehicle 10 when a start switch or the like is turned on to request start-up of a travel system including the driving unit 140.

When the user operates the MID 160 to request timer charging, the ECU 150 determines a time schedule for timer charging, and executes the external charging in accordance with the determined time schedule (timer charging). Specifically, the ECU 150 acquires the electric power rate information from the data center 30, and determines the time schedule in consideration of the electric power rate plans and in accordance with the expected time of departure set in the MID 160 (described later in detail). When the external charging start time comes in accordance with the time schedule, the ECU 150 controls the charging relay 125 to be in the conductive state, and controls the charger 120 to start the external charging. During execution of the external charging, the ECU 150 monitors a state of charge (SOC) of the electric storage device 130. When the SOC reaches a charging target value (for example, a full SOC), the ECU 150 determines that the external charging has completed and stops the charger 120. At the same time, the ECU 150 controls the charging relay 125 to be in the electric power cutoff state.

Assume a case where the time schedule for timer charging is determined so as to execute the external charging at the lowest electric power rate based on the electric power rate plans (electric power rate unit prices for each time slot). In this case, depending on the electric power rate plans, the time slot for performing the external charging may be divided into and set to a plurality of time slots. Consequently, the number of times of operation of the charging relay 125 and other devices that operate with execution and stop (including temporary stop and start) of the external charging increases, and load of the component members such as the charging relay 125 increases.

Accordingly, the charge controller according to the embodiment executes the external charging continuously from the start to the end of the external charging (for example, until the SOC reaches a full SOC) without stopping the external charging, and determines the time schedule so as to execute the external charging at the time when the external charging is continuously executed at the lowest electric power rate. Accordingly, since the external charging is executed continuously from the start to the end of the external charging without stopping the external charging, the number of times of operation of the charging relay 125 and other devices that operate with execution and stop of the external charging is suppressed. Since the time schedule is determined so as to execute the external charging at the time when the external charging is continuously executed at the lowest electric power rate, the electric power costs can be kept low. Accordingly, the charge controller makes it possible to pursue inexpensive external charging, while suppressing increase in the number of times of operation of the charging relay 125 and other devices that operate with execution and stop of the external charging.

Figure 3A:
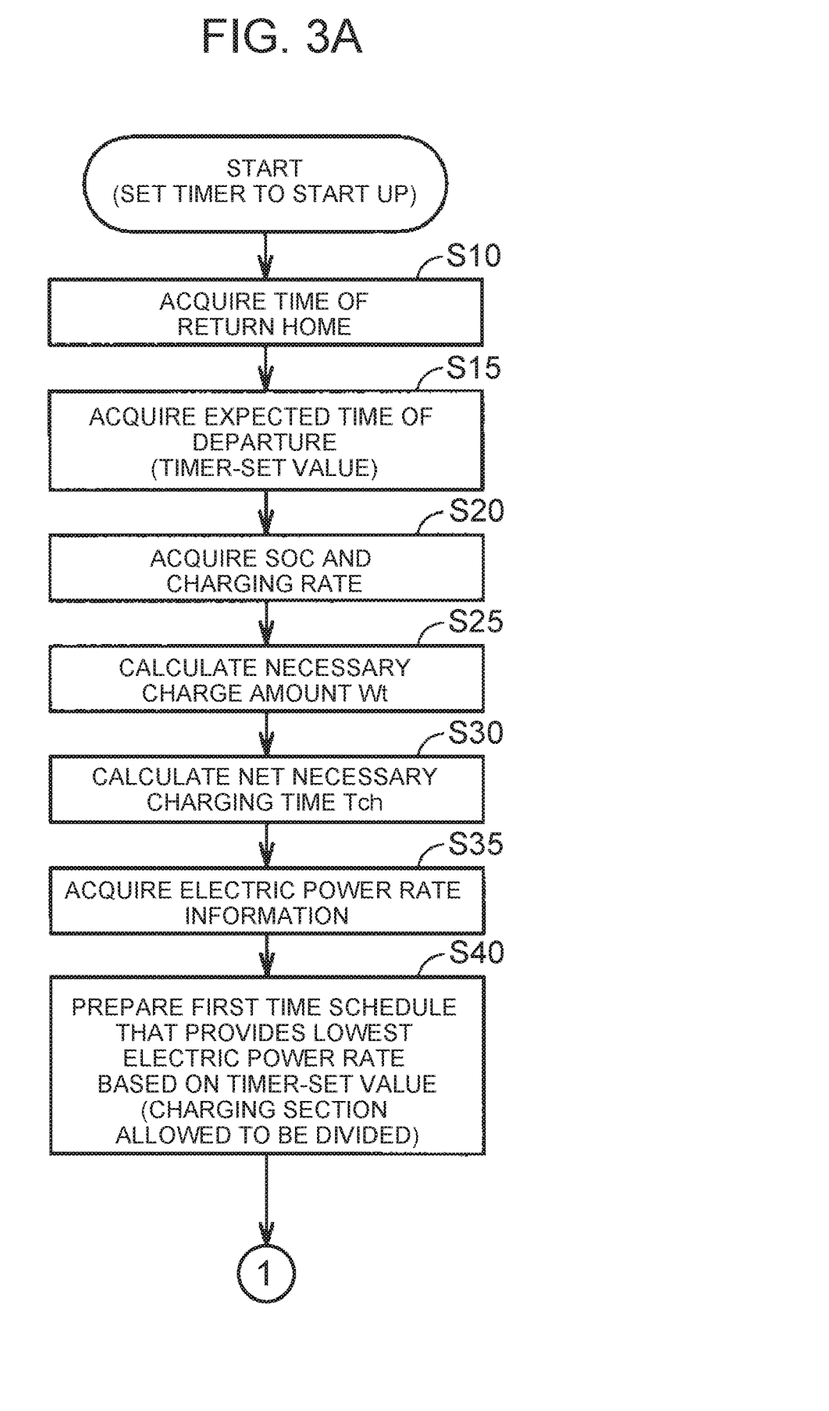
FIG. 3A is a flowchart illustrating the first half part of processing procedures of timer charging executed by an ECU illustrated in FIG. 2.
Figure 3B:
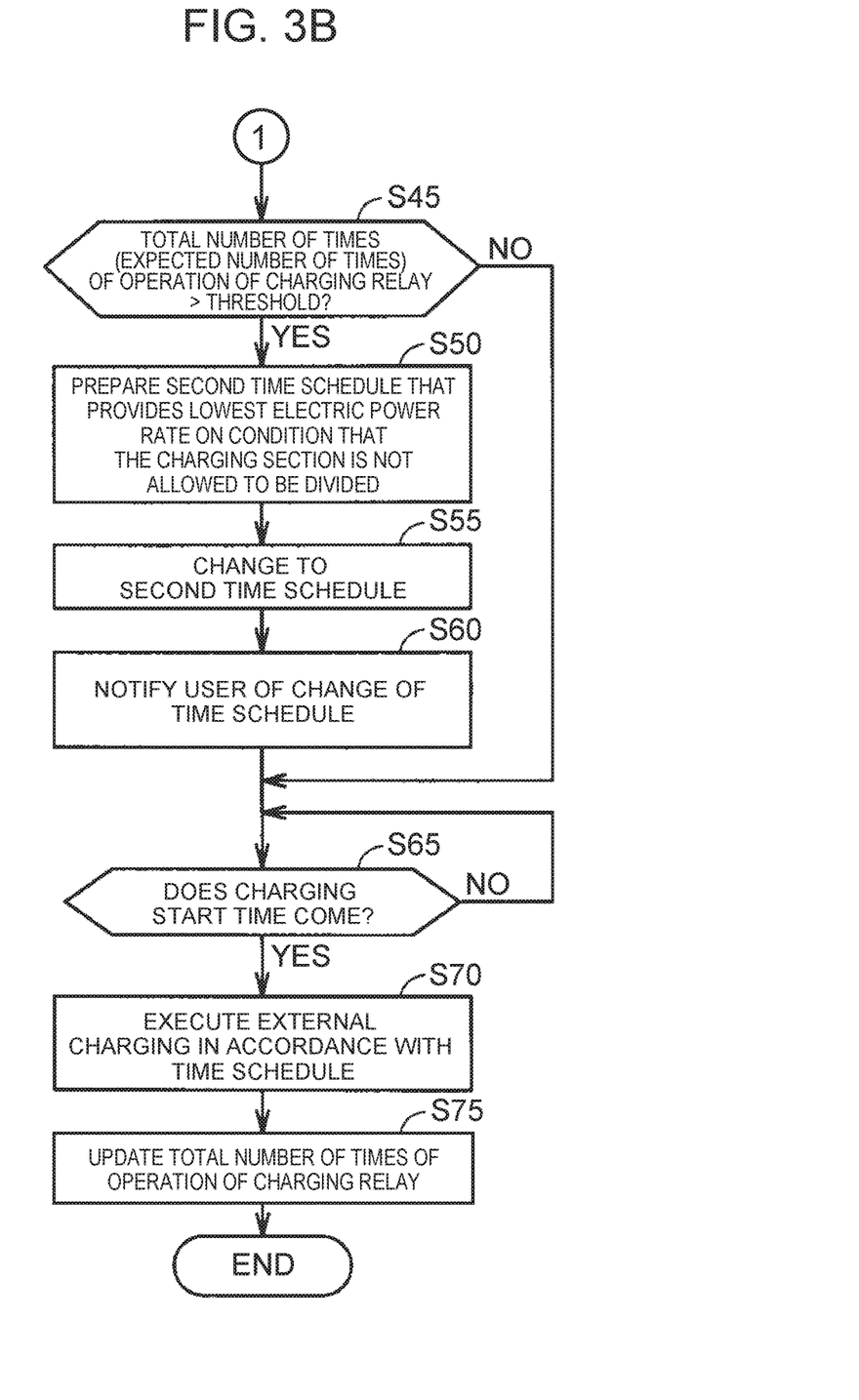
FIG. 3B is a flowchart illustrating the second half part of processing procedures of timer charging executed by an ECU illustrated in FIG. 2.

FIG. 3A and FIG. 3B together form a flowchart illustrating processing procedures of timer charging executed by the ECU 150 illustrated in FIG. 2. The processing illustrated in the flowchart is started when the user performs operation of timer charging (inputting expected time of departure and instructing execution of timer charging) with the MID 160, for example.

With reference to FIG. 3A, the ECU 150 acquires the time of returning home at which the vehicle 10 returns home (step S10). When the user performs timer charging operation after returning home and before getting off the vehicle, the ECU 150 acquires the current time at which the timer charging is operated as the time of returning home. When the timer charging is set before the time of returning home, the ECU 150 acquires the expected time of returning home input by the user with the MID 160 as the time of returning home.

The ECU 150 also acquires expected time of departure (timer setting value) input in the MID 160 by the user from the MID 160 (step S15). The ECU 150 further acquires data such as the SOC of the electric storage device 130, and a charging rate of the external charging (step S20). The charging rate of the external charging refers to the magnitude of electric power supplied to the electric storage device 130 from the power supply facility 20 through the charger 120 at the time of external charging. The charging rate may be rated electric power of the charger 120.

Next, the ECU 150 calculates a necessary charge amount Wt of the external charging (step S25). The necessary charge amount Wt can be calculated based on a shortage in the charge amount with respect to the fully-charged state of the electric storage device 130 (a difference between the SOC in the fully-charged state and the current SOC), the fully-charged state being attained when the external charging is completed.

The ECU 150 further calculates net necessary charging time Tch for charging the necessary charge amount Wt (step S30). The net necessary charging time Tch is the time substantially necessary for charging the necessary charge amount Wt. The net necessary charging time Tch can be calculated by dividing the necessary charge amount Wt by the charging rate acquired in step S20.

The ECU 150 acquires the electric power rate information from the data center 30 through the DCM 170 (step S35). As described in the foregoing, the electric power rate information includes information (electric power rate plans) indicative of the electric power rate unit price for each time slot.

The ECU 150 prepares the time schedule that provides the lowest electric power cost in consideration of the electric power rate plans and in accordance with the expected time of departure (timer setting value) acquired in step S15 (the time schedule prepared here is referred to as "first time schedule"). That is, the first time schedule is a "request time schedule" prepared in accordance with a user request (timer setting value). The first time schedule is prepared such that the charging section of the external charging is allowed to be divided and the external charging is performed preferentially in the time slots in which the electric power rate unit price is low based on the electric power rate plans during the period from the time of returning home to the expected time of departure. An example of a specific method for preparing the first time schedule will be illustrated later.

Next, the ECU 150 adds the number of times of operation of the charging relay 125 in a case of executing the external charging in accordance with the first time schedule to the previous total number of times of operation of the charging relay 125 (the total number of times of operation since the vehicle 10 has been manufactured). Thus, the total number of times (expected number of times) of operation of the charging relay 125 in the case where the external charging is executed in accordance with the first time schedule is estimated. The durability of the charging relay 125 is designed on the basis of the total number of times of operation. Therefore, the ECU 150 counts the total number of times of operation of the charging relay 125. The ECU 150 determines whether or not the total number of times of operation of the charging relay 125 exceeds a threshold in the case where the external charging is executed in accordance with the first time schedule (step S45). The threshold is set, for example, on the basis of the number of times of durable operation of the charging relay 125. The ECU 150 may determine whether or not the total number of times of operation of the charging relay 125 at the moment (the total number of times of operation since the vehicle 10 has been manufactured) exceeds the threshold, instead of determining whether or not the total number of times (expected number of times) of operation of the charging relay 125 in the case where the external charging is executed in accordance with the first time schedule exceeds the threshold.

When the ECU 150 determines that the total number of times of operation of the charging relay 125 is equal to or below the threshold (NO in step S45), the ECU 150 shifts the processing to step S65 (described later), without executing each processing of steps S50 to S60 stated below.

In step S45, when the ECU 150 determines that the total number of times of operation of the charging relay 125 exceeds the threshold (YES in step S45), the ECU 150 prepares a time schedule (the time schedule prepared here is referred to as "second time schedule" below) that provides the lowest electric power cost in consideration of the electric power rate plans on condition that the charging section of the external charging is not allowed to be divided (i.e., the external charging is continuously executed without a stop in the middle of the external charging). That is, since dividing the charging section of the external charging causes increase in the number of times of operation of the charging relay 125, dividing the charging section of the external charging is not allowed in the second time schedule in order to suppress the increase in the number of times of operation of the charging relay 125. The second time schedule is prepared so as to execute the external charging at the time when the electric power cost in a case where the external charging is continuously executed is the lowest on the basis of the electric power rate plans during the period from the time of returning home to the expected time of departure. An example of a specific method for preparing the second time schedule will also be illustrated later.

The ECU 150 then changes the time schedule for timer charging from the first time schedule prepared in step S40 to the second time schedule (step S55). The ECU 150 further controls the MID 160 to display a message that the schedule is changed from the first time schedule to the second time schedule, and notifies the user of the change of the time schedule (step S60). Accordingly, the user can recognize that the time schedule has been changed in order to suppress the increase in the total number of times of operation of the charging relay 125.

When the ECU 150 executes the processing of step S60, or determines that the total number of times of operation of the charging relay 125 is equal to or below the threshold (NO in step S45), the ECU 150 determines whether or not charging start time comes in accordance with the first time schedule determined in step S40 or the second time schedule changed from the first time schedule in step S55 (step S65). The ECU 150 may shift to a sleep state until the charging start time comes.

When the charging start time comes (YES in step S65), the ECU 150 controls the charging relay 125 to be in the conductive state and drives the charger 120 to execute the external charging in accordance with the time schedule for timer charging (step S70). The ECU 150 then updates the total number of times of operation of the charging relay 125 in accordance with actual operation of the charging relay 125 (step S75).

Figure 4:
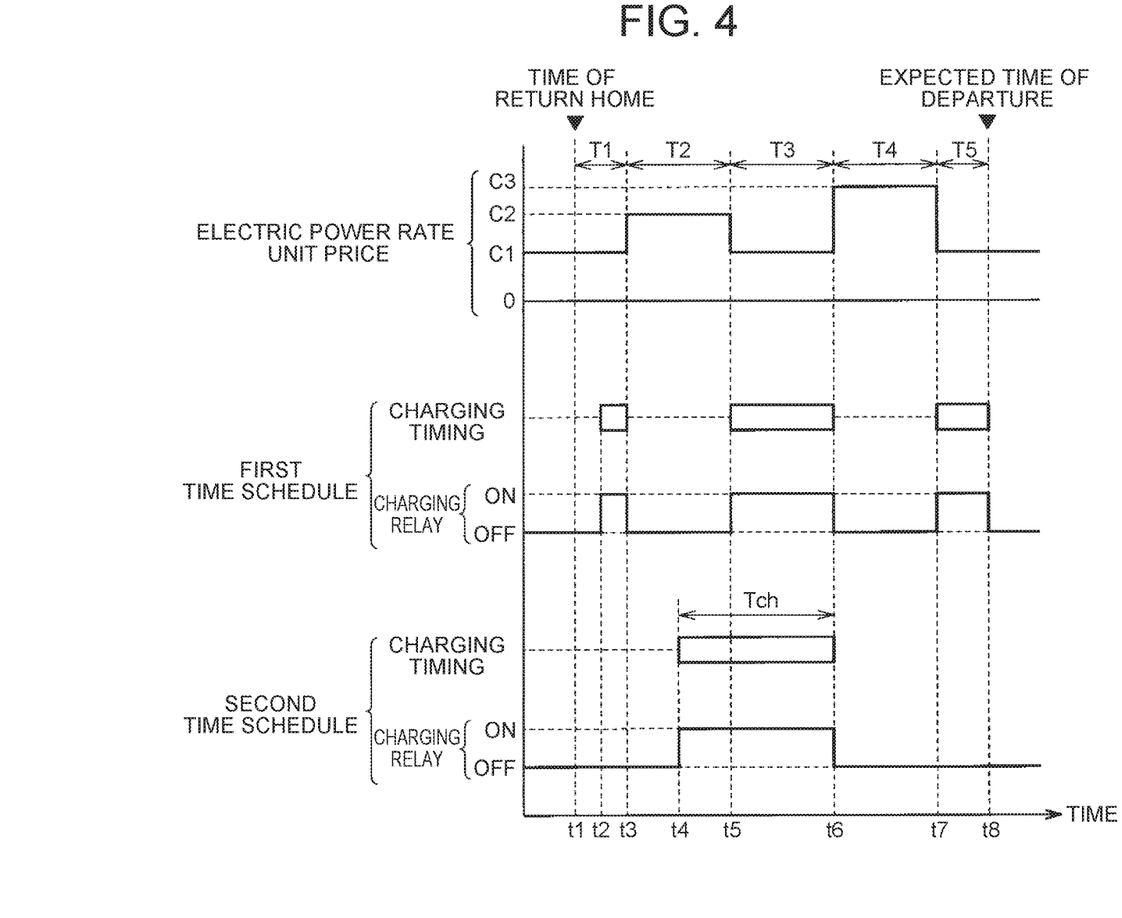
FIG. 4 illustrates an example of preparing a first time schedule and a second time schedule.

FIG. 4 illustrates an example of preparing the first time schedule and the second time schedule. With reference to FIG. 4, the user returns home at time t1, and sets the expected time of departure at time t8. In a period from time t1 to t8 in which external charging is possible, time slots T1 to T5 are present in accordance with the electric power rate plans acquired from the data center 30. In this example, among the time slots T1 to T5, the electric power rate unit price in the time slots T1, T3, T5 is the lowest. The electric power rate unit price of the time slot T2 is higher than the electric power rate unit price of the time slots T1, T3, T5. The electric power rate unit price of the time slot T4 is higher than the electric power rate unit price of the time slot T2.

In this example, in the period from time t1 to t8 in which external charging is allowed, the net necessary charging time Tch is longer than each of the time slots T1, T3, T5 in which the electric power rate unit price is the lowest. Therefore, in the first time schedule that allows the charging section of the external charging to be divided, the time slots T1, T3, T5 that are lowest in the electric power rate unit price are preferentially used such that the external charging is executed by appropriately dividing and assigning the charging time to the time slots T1, T3, T5. For example, in order to avoid the situation where the electric storage device 130 is left in a high SOC state after completion of charging, the charging time is first assigned to the latest (close to the expected time of departure) time slot T5 and then to the time slot T3. Then in time slot T1, the remaining charging time is assigned to a period from time t2 to time t3 that is the finish time of the time slot T1.

In the second time schedule that does not allow the charging section of the external charging to be divided, the external charging is executed at the time when the external charging is continuously executed at the lowest electric power rate in the period from time t1 to t8 where the external charging is allowed. In this example, the charging time is first allocated to the time slot T3 having a longest time length among the time slots T1, T3, T5 that have the lowest electric power rate unit price. Then, in the time slot T2 that is lower in electric power rate unit price than the time slot T4, among the time slots T2, T4 around the time slot T3, the remaining charging time is allocated to a period from time t4 to time t5 that is the end of the time slot T2.

Thus, in the first time schedule that allows the charging section of the external charging to be divided, the time slots T1, T3, T5 that are lowest in the electric power rate unit price are preferentially used such that the external charging is executed by dividing and assigning the charging time to the time slots T1, T3, T5. In time t1 to t2 in the time slot T1, the time slot T2, and the time slot T4, the external charging temporarily stops. With the temporary stop and restart of the external charging, the charging relay 125 operates.

In the second time schedule that does not allow the charging section of the external charging to be divided, the external charging is executed at time t4 to t6 when the external charging is continuously executed at the lowest electric power rate. Since the external charging is continuously executed from time t4 to time t6, there is no operation of the charging relay 125 caused by temporary stop and restart of the external charging as in the case where the external charging is executed in accordance with the first time schedule. Therefore, when the external charging is executed in accordance with the second time schedule, increase in the number of times of operation of the charging relay 125 is suppressed as compared with the case where the external charging is executed in accordance with the first time schedule.

Figure 5:
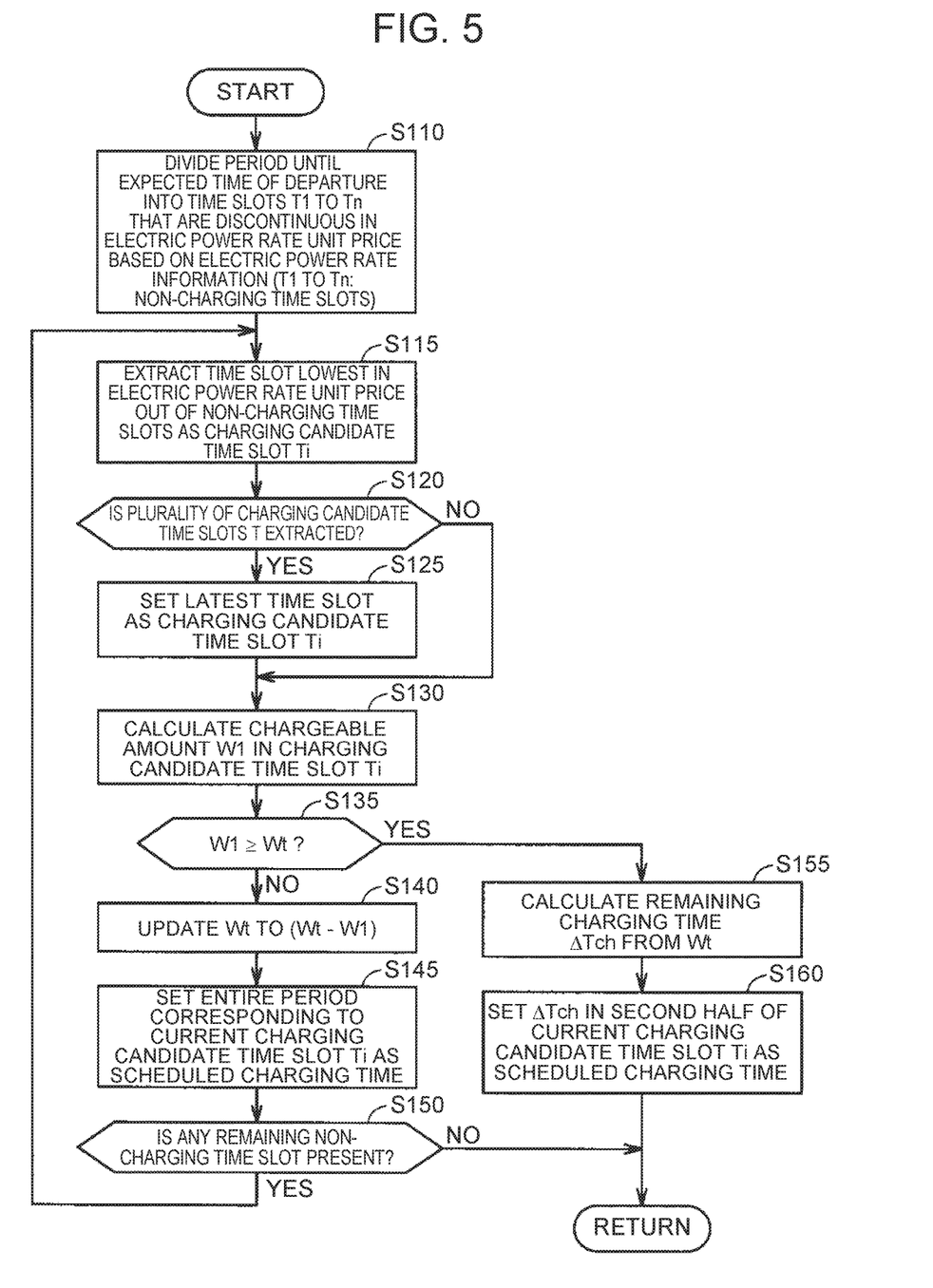
FIG. 5 is a flowchart illustrating one example of processing procedures for preparing the first time schedule.

FIG. 5 is a flowchart illustrating one example of processing procedures for preparing the first time schedule. That is, the processing illustrated in the flowchart is executed in step S40 of FIG. 3A.

With reference to FIG. 5, in accordance with the electric power rate information (electric power rate plan) acquired from the data center 30, the ECU 150 divides a period from the time of returning home to the expected time of departure into time slots T1 to Tn (n is a natural number) that are discontinuous in the electric power rate unit price (step S110). In step S110, all the time slots T1 to Tn are "non-charging time slots" as an initial state.

Next, the ECU 150 extracts the time slot whose electric power rate is the lowest, out of the non-charging time slots, as charging candidate time slot Ti (step S115). When a plurality of time slots equal in the electric power rate unit price are extracted in step S115 (YES in step S120), the ECU 150 sets only the latest (closest to the expected time of departure) time slot, among the extracted time slots, as the charging candidate time slot Ti (step S125). When only one time slot is extracted in step S115 (NO in step S120), the one time slot is set as the charging candidate time slot Ti.

Next, the ECU 150 calculates a chargeable amount W1 in the charging candidate time slot Ti (step S130). The chargeable amount W1 can be calculated by multiplying a charging rate (for example, rated electric power of the charger 120) of the external charging by a time length of the charging candidate time slot Ti. Furthermore, the ECU 150 determines whether or not the calculated chargeable amount W1 is equal to or above the necessary charge amount Wt (step S135).

When the ECU 150 determines that the chargeable amount W1 is less than the necessary charge amount Wt (NO in step S135), the charging in the charging candidate time slot Ti is not enough to complete the external charging. Accordingly, the ECU 150 updates the necessary charge amount Wt by subtracting the chargeable amount W1 from the necessary charge amount Wt (step S140), and sets the entire period corresponding to the current charging candidate time slot Ti as a scheduled charging time (step S145). As a consequence, the time slot set as the charging candidate time slot Ti is excluded from the non-charging time slots. Hereinafter, the necessary charge amount Wt means a remaining necessary charge amount to be charged by the external charging.

The ECU 150 then determines whether or not any non-charging time slot remains in the time slots T1 to Tn (step S150). When determining that the remaining non-charging time slot is present (YES in step S150), the ECU 150 returns the processing to step S115 to secure the remaining charge amount. As a consequence, the charging candidate time slot Ti is updated (steps S115 to S125), and it is able to determine whether or not the external charging can be completed in the updated charging candidate time slot Ti (steps S130, S135).

When the chargeable amount W1 becomes equal to or above the necessary charge amount Wt in the updated charging candidate time slot Ti (YES in step S135), the ECU 150 can complete the external charging by the charging performed in the charging candidate time slot Ti. Consequently, the ECU 150 exits from a repeat loop of steps S115 to S150, and calculates remaining charging time ΔTch for charging the remaining necessary charge amount Wt (step S155). The ECU 150 then sets a period which is in the current charging candidate time slot Ti and corresponds to the remaining charging time ΔTch and ends at the time where the charging candidate time slot Ti ends as the scheduled charging time (step S160). When W1=Wt in step S135, the entire current charging candidate time slot Ti is set as the scheduled charging time.

While the non-charging time slot remains (YES in step S150), the ECU 150 repeats the processing of steps S115 to S145, so that the time slot having the lowest electric power unit price is sequentially selected out of the non-charging time slots as the charging candidate time slot Ti, and is set as the scheduled charging time until charging of the initial value of the necessary charge amount Wt (the necessary charge amount Wt calculated in step S25 of FIG. 3A) is completed. Once all the time slots T1 to Tn are selected as a charging target, the ECU 150 determines that no remaining non-charging time slot is present in step S150 (NO in step S150), and shifts the processing to RETURN.

Figure 6:
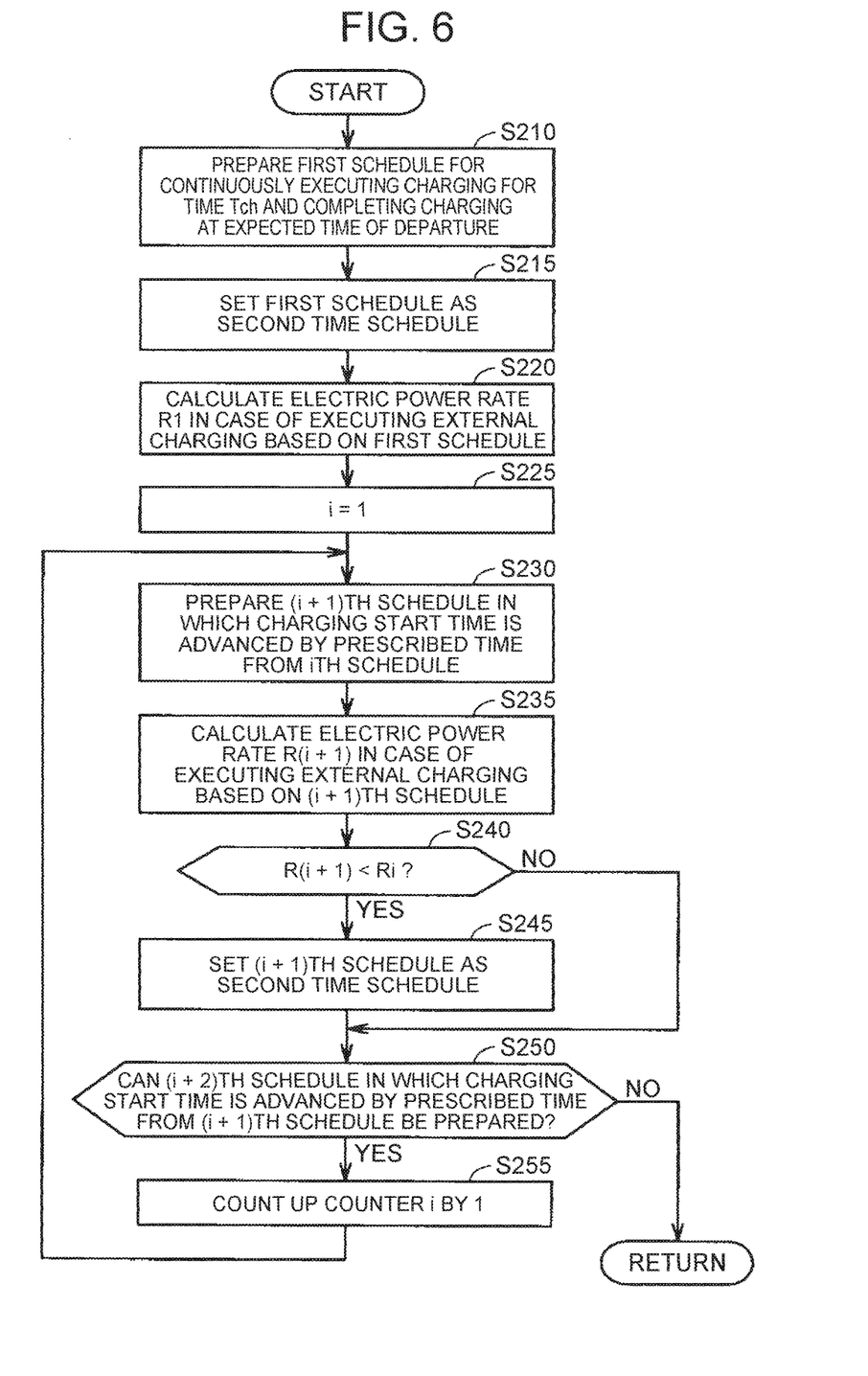
FIG. 6 is a flowchart illustrating one example of processing procedures for preparing the second time schedule.

FIG. 6 is a flowchart illustrating one example of processing procedures for preparing the second time schedule. That is, the processing illustrated in the flowchart is executed in step S50 of FIG. 3B.

With reference to FIG. 6, the ECU 150 prepares a first schedule in which the external charging is executed continuously for net necessary charging time Tch to charge the necessary charge amount Wt, and the external charging is completed at the expected time of departure (step S210). The ECU 150 sets the prepared first schedule as a second time schedule (step S220). The ECU 150 further calculates an electric power cost R1 in a case of executing the external charging based on the first schedule in accordance with the electric power rate information (electric power rate plan) acquired from the data center 30 (step S220). The ECU 150 then sets a counter i (i is a natural number) to an initial value "1" (step S225).

Next, the ECU 150 prepares a $(i+1)^{th}$ schedule in which the charging start time is advanced by a prescribed time from the $i^{th}$ schedule (step S230). The prescribed time may be several minutes or about 10 minutes, for example. The $(i+1)^{th}$ schedule is also the schedule for executing the external charging continuously for the net necessary charging time Tch to charge the necessary charge amount Wt. When the charging start time in the $(i+1)^{th}$ schedule comes before the time of returning home, a schedule in which the external charging is executed continuously for the net necessary charging time Tch from the time of returning home is prepared as the $(i+1)^{th}$ schedule.

The ECU 150 then calculates an electric power cost R(i+1) in a case of executing the external charging based on the $(i+1)^{th}$ schedule in accordance with the electric power rate plans (step S235). The ECU 150 further determines whether or not the calculated electric power rate R(i+1) is lower than the electric power rate Ri (step S240).

When the ECU 150 determines that the electric power rate R(i+1) is lower than the electric power rate Ri (YES in step S240), the ECU 150 sets the $(i+1)^{th}$ schedule as the second time schedule (step S245). That is, since the electric power rate is lower in the $(i+1)^{th}$ schedule than that in the $i^{th}$ schedule, the second time schedule is updated to the $(i+1)^{th}$ schedule.

When the electric power rate R(i+1) is equal to or above the electric power rate Ri (NO in step S240), the ECU 150 shifts the processing to step S250 while leaving the second time schedule as the $i^{th}$ schedule. When the electric power rate R(i+1) is equal to the electric power rate Ri, the $i^{th}$ schedule in which the external charging is completed later is adopted in order to avoid the situation where the electric storage device 130 is left in the state of a high SOC after completion of charging.

Next, the ECU 150 determines whether or not a $(i+2)^{th}$ schedule can be prepared (step S250). The $(i+2)^{th}$ schedule is a schedule in which the charging start time is further advanced by a prescribed time from the $(i+1)^{th}$ schedule. When the charging start time in the $(i+1)^{th}$ schedule is already the earliest time (time of returning home), the ECU 150 determines that the $(i+2)^{th}$ schedule cannot be prepared (NO in step S250), and shifts the processing to RETURN.

When the ECU 150 determines that the $(i+2)^{th}$ schedule can be prepared (YES in step S250), the ECU 150 counts up the counter i by 1 (step S255), and returns the processing to step S230 to search for a more inexpensive schedule.

Thus, the ECU 150 searches for a schedule for executing the external charging continuously for the net necessary charging time Tch to charge the necessary charge amount Wt at the lowest electric power cost during the period from the time of returning home to the scheduled time of departure, and sets the second time schedule.

As described in the foregoing, in the embodiment, the second time schedule for executing the external charging continuously from the start to the end of the external charging without stopping the external charging is set. Accordingly, increase in the number of times of operation of the charging relay 125 that operates with execution and stop of the external charging is suppressed. Since the second schedule is determined so as to execute the external charging at the time when the electric power cost in the case where the external charging is continuously executed is the lowest, the electric power costs can also be reduced. Accordingly, the embodiment makes it possible to pursue inexpensive external charging, while suppressing increase in the number of times of operation of the charging relay 125 that operates with execution and stop of the external charging.

In the embodiment, when the first time schedule set in accordance with a request of the user includes a stop of the external charging during the period from the start to the end of the external charging, the first time schedule is changed to the second time schedule. Therefore, according to the embodiment, inexpensive external charging can be pursued, while a priority is placed on the user request, so that the increase in the number of times of operation of the charging relay 125 can be suppressed.

In the embodiment, when the total number of times of operation of the charging relay 125 exceeds a threshold, timer charging based on the second time schedule is executed. Therefore, according to the embodiment, the increase in the total number of times of operation of the charging relay 125 is suppressed only when the total number of times of operation of the charging relay 125 exceeds the threshold. When the total number of times of operation of the charging relay 125 is equal to or below the threshold, the time of executing the external charging can be divided and assigned to a plurality of time slots that offer relatively low electric power rates so as to pursue the most inexpensive external charging based on the first time schedule without taking into consideration the number of times of operation of the charging relay 125.

According to the embodiment, when the first time schedule is changed to the second time schedule, the user is notified of the change in the MID 160. Accordingly, the user can recognize that the time schedule is changed in order to suppress the increase in the total number of times of operation of the charging relay 125.

In the embodiment disclosed, the device that operates with execution and stop of the external charging has been described as the charging relay 125. However, the device is not limited to the charging relay 125. For example, when a system relay (not illustrated) provided between the electric storage device 130 and the driving unit 140 operates with execution and stop of the external charging, the system relay is also included in the devices that operate with execution and stop of the external charging.

In the embodiment, the ECU 150 of the vehicle 10 is configured to prepare the time schedules (first and second time schedules). However, other than the ECU 150 of the vehicle 10, the time schedules may also be prepared by the data center 30 or mobile terminals capable of communicating with the vehicle 10 and the data center 30.

It should be understood that the embodiment disclosed is in all respects illustrative and is not considered as the basis for restrictive interpretation. The scope of the present disclosure is not defined by the foregoing description of the embodiment. Rather, it is defined by the range of appended claims. All the changes which come within the range of the claims, and meaning and the range of equivalency thereof are therefore intended to be embraced therein.

What is claimed is:

1. A charge controller that controls execution of external charging to charge an electric storage device mounted on a vehicle with a power source outside the vehicle, the charge controller comprising:
   an electronic control unit configured to:
   i) start the external charging in accordance with a time schedule;
   ii) acquire information about electric power rates of electric power supplied from the power source in each specified time slot;
   iii) determine whether in a request time schedule set in accordance with a request from a user, a total number of stops of the external charging during a period from a start to an end of the external charging exceeds a threshold; and
   iv) determine a second time schedule where the external charging is executed continuously from a start to an end of the external charging without stopping the external charging and an electric power cost in a case where the external charging is continuously executed is the lowest based on the information about electric power rates, in response to determining that the total number of stops of the external charging during the period from the start to the end of the external charging exceeds the threshold.

2. The charge controller according to claim 1, wherein the electronic control unit is configured to notify the user of a change of the time schedule from the request time schedule to the second time schedule.

3. The charge controller according to claim 1, wherein a device that operates with execution and stop of the external charging is provided in a charge path extending from the power source to the electric storage device.

4. The charge controller according to claim 3, wherein:
   the device includes a relay; and
   the electronic control unit is configured to execute processing of determining the second time schedule when a total number of times of operation of the relay exceeds a threshold.

5. The charge controller according to claim 4, wherein the electronic control unit is configured to notify the user of a change of the time schedule from the request time schedule to the second time schedule.

6. A charge control method for controlling execution of external charging to charge an electric storage device mounted on a vehicle with a power source outside the vehicle, the charge control method comprising:
   acquiring information about electric power rates of electric power supplied from the power source in each specified time slot;
   determining whether in a request time schedule set in accordance with a request from a user, a total number of stops of the external charging during a period from a start to an end of the external charging exceeds a threshold;
   determining a second time schedule where the external charging is executed continuously from a start to an end of the external charging without stopping the external charging and an electric power cost in a case where the external charging is continuously executed is the lowest based on the information about electric power rates, in response to determining that the total number of stops of the external charging during the period from the start to the end of the external charging exceeds the threshold; and
   starting the external charging in accordance with the second time schedule.

* * * * *